United States Patent
Moore

(10) Patent No.: US 8,564,695 B2
(45) Date of Patent: Oct. 22, 2013

(54) METHOD AND SYSTEM FOR REPEATED FIXED PATTERN NOISE CORRECTION

(75) Inventor: John Kevin Moore, Edinburgh (GB)

(73) Assignee: STMicroelectronics (Research & Development) Limited, Marlow, Buckinghamshire (GB)

(*) Notice: Subject to any disclaimer, the term of this patent is extended or adjusted under 35 U.S.C. 154(b) by 396 days.

(21) Appl. No.: 12/945,422

(22) Filed: Nov. 12, 2010

(65) Prior Publication Data
US 2011/0128420 A1  Jun. 2, 2011

(30) Foreign Application Priority Data
Nov. 30, 2009 (GB) .................................... 0920921.4

(51) Int. Cl.
*H04N 5/217* (2011.01)
(52) U.S. Cl.
USPC ........................................................ 348/241
(58) Field of Classification Search
USPC ........................................................ 348/241
See application file for complete search history.

(56) References Cited

U.S. PATENT DOCUMENTS

| 7,133,073 B1 | 11/2006 | Neter |
| 2004/0113046 A1 | 6/2004 | Gorder et al. |
| 2004/0233305 A1* | 11/2004 | Morishita ............ 348/245 |
| 2005/0104981 A1* | 5/2005 | Findlater et al. ........ 348/241 |
| 2008/0291290 A1 | 11/2008 | Sonoda et al. |

FOREIGN PATENT DOCUMENTS

| EP | 1 615 426 A1 * | 1/2006 |
| EP | 1615426 A1 | 1/2006 |
| EP | 1 993 277 A2 * | 11/2008 |
| EP | 1993277 A2 | 11/2008 |
| WO | WO-2009/017920 A1 | 2/2009 |

OTHER PUBLICATIONS

EPO Search Report and Written Opinion mailed Mar. 29, 2011 for EP 10190989.3 (10 pages).
Search Report mailed Feb. 8, 2010, for GB0920921.4 (4 pages).

* cited by examiner

*Primary Examiner* — James Hannett
(74) *Attorney, Agent, or Firm* — Gardere Wynne Sewell LLP

(57) ABSTRACT

Repeated Fixed Pattern Noise (FPN) in solid state image sensors for a digitally encoded image captured with a sensor is corrected by exploits the periodicity of FPN pattern. In this way FPN is compensated by using a repeating pattern that is associated with repeating blocks of layout.

19 Claims, 7 Drawing Sheets

METHOD AND SYSTEM FOR REPEATED FIXED PATTERN NOISE CORRECTION

PRIORITY CLAIM

This application claims priority from Great Britain Application for Patent No. 0920921.4 filed Nov. 30, 2009, the disclosure of which is hereby incorporated by reference.

FIELD OF TECHNOLOGY

The present disclosure relates to solid state image sensors using CMOS technology, more particularly to a method and system for correcting repeated fixed pattern noise (FPN) in solid state image sensors.

BACKGROUND

Solid state image sensors normally include an array of pixels arranged in rows and columns which form a bi-dimensional image representation. An image is read out, row by row, via an array of Analog to Digital Converters (ADC). Every pixel in a column of data is read out by the same ADC. As a result of process mismatch, the pixel data read out from a single column may have an associated offset with respect to its neighbors. Since this fixed offset will be apparent in every pixel read out by that ADC, i.e. a column of data, the resulting image artifact is commonly known as Vertical Fixed Pattern Noise (VFPN) or Fixed Pattern Noise (FPN).

One approach which has been used in the known systems to adjust the resulting image is to counteract the effect of VFPN with a cancellation mechanism.

U.S. Patent Application 2005/0104981 (the disclosure of which is hereby incorporated by reference) discloses a method for correcting column FPN in image sensors including an output circuit for each column for reading pixel image signals by means of a pair of sample capacitors and a switching circuit operable based upon pixel switches for applying pixel voltages to the pair of sample capacitors. Each column has an optically masked pixel which does not contribute to the image but is used to estimate the column FPN. An image processing circuit records the column FPN for each column from the optically masked pixels, records the image signal from the sensor array of active pixels and subtracts the column FPN column-wise from the image signal.

The technique discussed in U.S. Patent Application 2005/0104981 will remove from the correction data, for a sensor employing a Sample and Hold readout methodology, the temporal noise contribution of the pixel but it will not account for temporal noise associated with ADC circuitry. For a continuous time system, which performs an auto-zero operation on the black value and then maintains a continuous connection to the pixel to convert the signal component to a digital code, this methodology is not useful: there is no CDSSIG (Correlated Double Sampling SIGnal) pulse to remove. Removing the TG pulse will allow the reset noise contribution to be removed but noise from the source follower (dominated by Random Telegraphic Signal (RTS) noise and 1/f noise) in addition to other noise, including noise from the ADC, will remain.

With the approach described in U.S. Patent Application 2005/0104981 some noise contributions are stored in the correction data, including temporal noise from the comparator and kTC noise: these noise contributions will be added to pixels from the visible array and will introduce new Vertical Fixed Pattern noise components. Also the described method is specific to a sample and hold readout methodology, and cannot be fully applied to a continuous time architecture.

In order to efficiently bias ADC circuitry and to include an Analog Binning switch implementation to enable Bayer-Scaling, a block of circuitry over multiple columns may be used. Analog Binning is a known technique which allows a number of pixel outputs to be averaged on a capacitive network at the input of a single ADC. Bayer scaling is a technique to average pixel outputs within the red, green and blue Bayer Pattern. Bayer Scaling enables the read out, at high speed, of a reduced sized frame of data with lower noise than would be possible with a basic sub-sampling approach. Design features such as Bayer Scaling switch networks and biasing schemes across multiple columns could cause slight differences from the column to column layout and this can result in column to column offsets which follow a periodic pattern across the array.

There is a need in the art to overcome at least some of the foregoing problems.

SUMMARY

According to one aspect of the present disclosure there is provided a method for correcting FPN in solid state image sensors with a correction mechanism which exploits the periodicity of CMOS sensor ADC readout circuitry to increase the number of samples averaged to aid in the reduction of temporal and fixed noise contributions associated with the readout of a single pixel.

The method according to preferred embodiments of the present disclosure uses the average of a large number of samples to reduce the temporal noise contribution stored from the readout of information from the shielded pixels. The samples in this average are taken both in time, and across a number of columns in the x direction in accordance with the periodicity of the CMOS sensor ADC readout circuitry. In an embodiment of the present disclosure, these samples are then subtracted from the visible rows read out in an effort to cancel the Repeated Pattern FPN visible in the final image.

The present disclosure offers a number of benefits. One of the advantages of the method according to a preferred embodiment of the present disclosure is that the Repeated Vertical FPN effect is counteracted with a simple correction mechanism which limits the total number of line readings required. Another advantage of the method according to a preferred embodiment of the present disclosure is that the processing time is greatly reduced by using a smaller sample of correcting pixel values, exploiting the periodicity of the measured FPN, while minimizing temporal pixel noise contributions to the same extent.

BRIEF DESCRIPTION OF THE DRAWINGS

Reference will now be made, by way of example, to the accompanying drawings, in which.

DETAILED DESCRIPTION OF THE DRAWINGS

Figure 1:
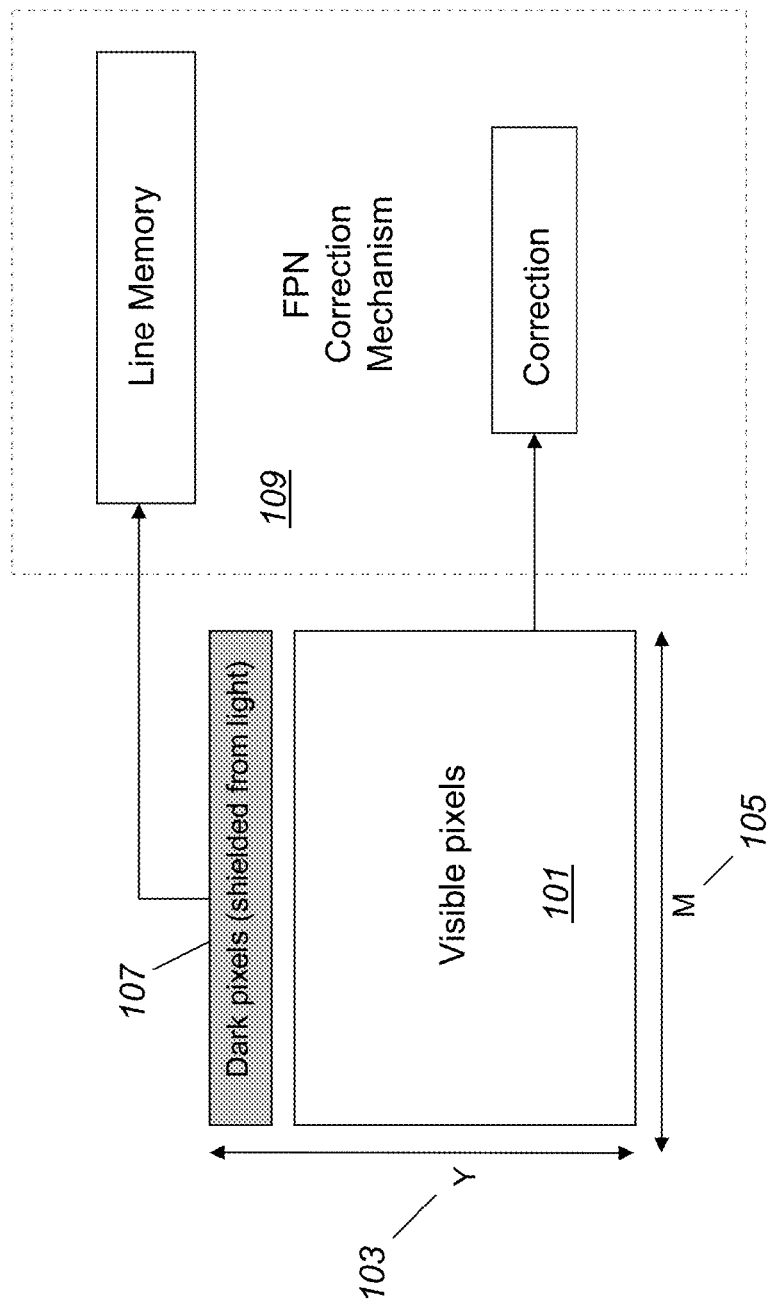
FIG. 1 is a schematic diagram of an image sensor according to a preferred embodiment of the present disclosure.

FIG. 1 shows a CMOS integrated image sensor, according to a preferred embodiment of the present disclosure, having an array of active pixels 101 arranged in Y rows 103 and M columns 105. To realize the correction mechanism, in a preferred embodiment of the present disclosure, the array of active pixels 101 includes at least one row of black (or dummy) pixels 107, which are identical to standard image pixels, but are not used to obtain image data. These black pixels are optically masked, i.e. they are shielded from incident radiation, so that output image signals obtained from the optically masked pixels can be used to represent the related column FPN, as they have no component which relates to incident radiation, and can be used to correct such noise. Data from the dark pixels area are supplied to an FPN Correction Mechanism 109 and are used to adjust the visible read out data obtained by the array 101.

Figure 2:
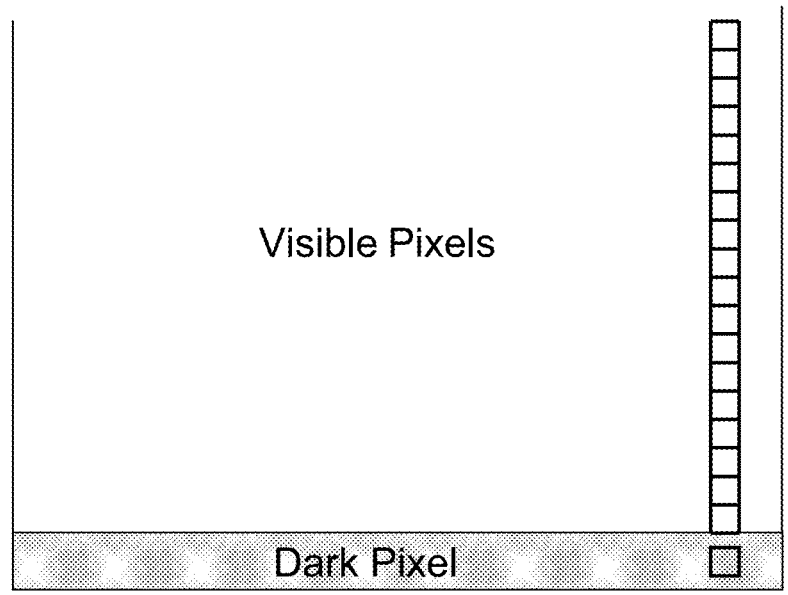
FIG. 2 schematically shows the visible pixels and the optically masked pixel in the image sensor according to a preferred embodiment of the present disclosure.

FIG. 2 shows the example of one column of visible pixels 201 with the corresponding dark pixel 203 which represents the column FPN and must be subtracted to each pixel of the same column 201. The dark pixels area can include a plurality of rows, e.g. according to a preferred embodiment of the present disclosure 24 physical rows of dark pixels are included in the image sensor. In a preferred embodiment these rows will be addressed multiple times so that the total number of readings is around 250. This ensures that any possible deviation due to physical differences is greatly limited. The array of active pixels of the system according to preferred embodiments of the present disclosure has been described in term of rows and columns, just for ease of description. Those skilled in the art will easily appreciate that the terms rows and columns just want to indicate the two dimensions of the array of active pixels, but could of course be arranged in an inverse order so that the rows are columns and vice versa.

Figure 4:
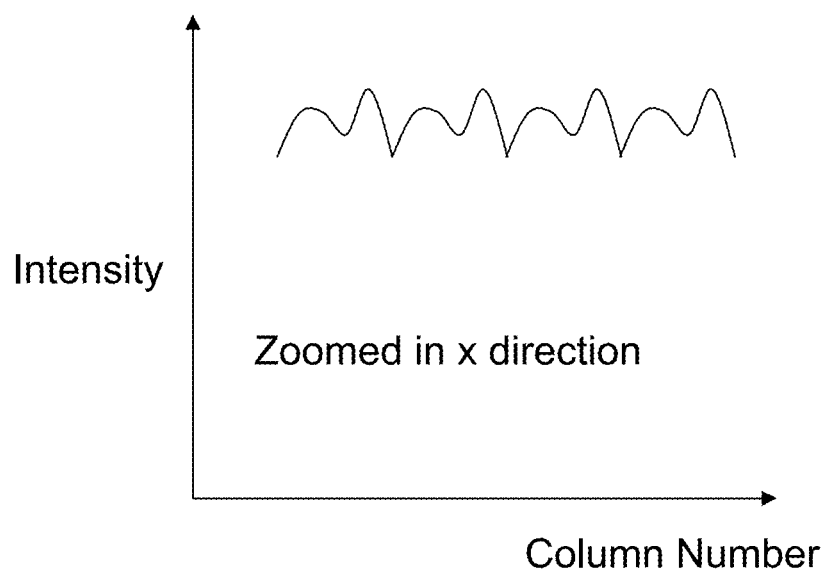
FIG. 4 schematically shows the repeated FPN effect.
Figure 3A:
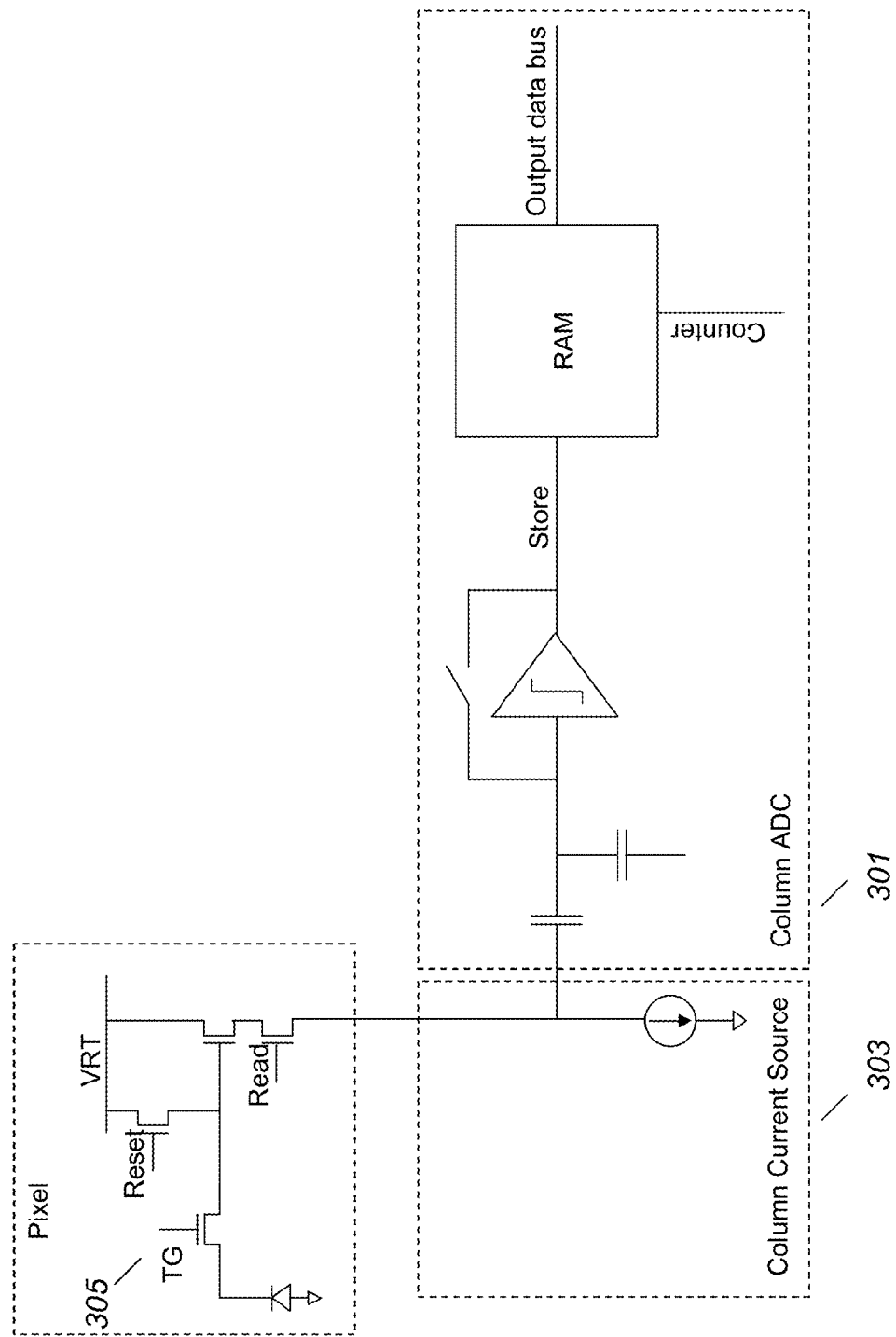
FIGS. 3a and 3b schematically shows the circuit of an image sensor according to a preferred embodiment of the present disclosure.
Figure 3B:
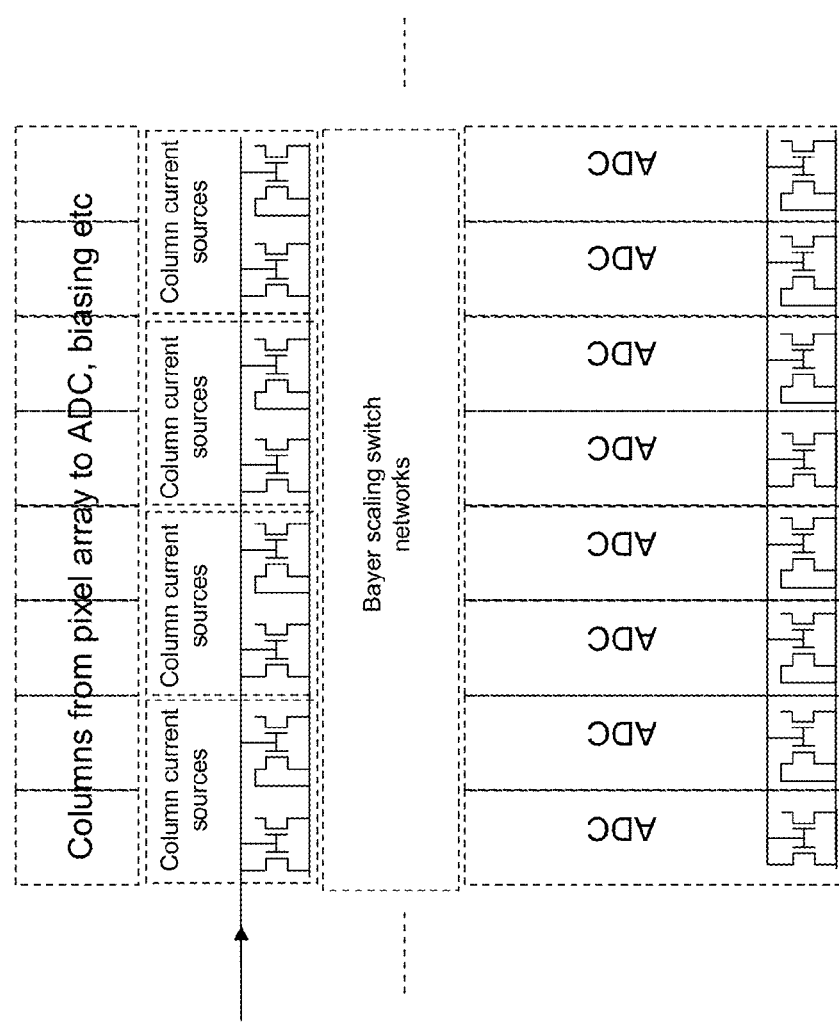

As shown in FIG. 3a, in a preferred embodiment of the present disclosure each column of the pixel array shares a common ADC, termed 'Column ADC' 301 and column current source 303. In order to optimize the layout of these components in terms of area and current consumption the column current source and comparator biasing networks are laid out in repeating blocks across multiple columns as shown in FIG. 3b (common block readout). Bayer Scaling switches cross several columns (e.g. 8) as this is a key requirement of their operation. Laying out the device in this manner is efficient, but it also opens up possibilities for periodic offset patterns in ADC output code values as shown in FIG. 4. The periodicity of such repeated noise pattern depends on the size of the common block readout and therefore can vary from one image sensor to the other. This may be due to parasitic capacitances or resistances, or physical effects of column to column differences on transistor parameters. Efforts are made by intelligent layout to minimize mismatching effects, however sensible variations can occur. For example in a sensor with a non-optimal layout at the ADC input, a variation of around 6 codes (200 uV) could be observed. The periodic column offsets are very visible to the eye, and will be known as Repeated Fixed Pattern Noise (Repeated FPN). According to a preferred embodiment the method for correcting FPN, instead of using only correction values from the same column to which the correction is applied, also exploits the periodicity of CMOS sensor ADC readout circuitry.

Figure 5:
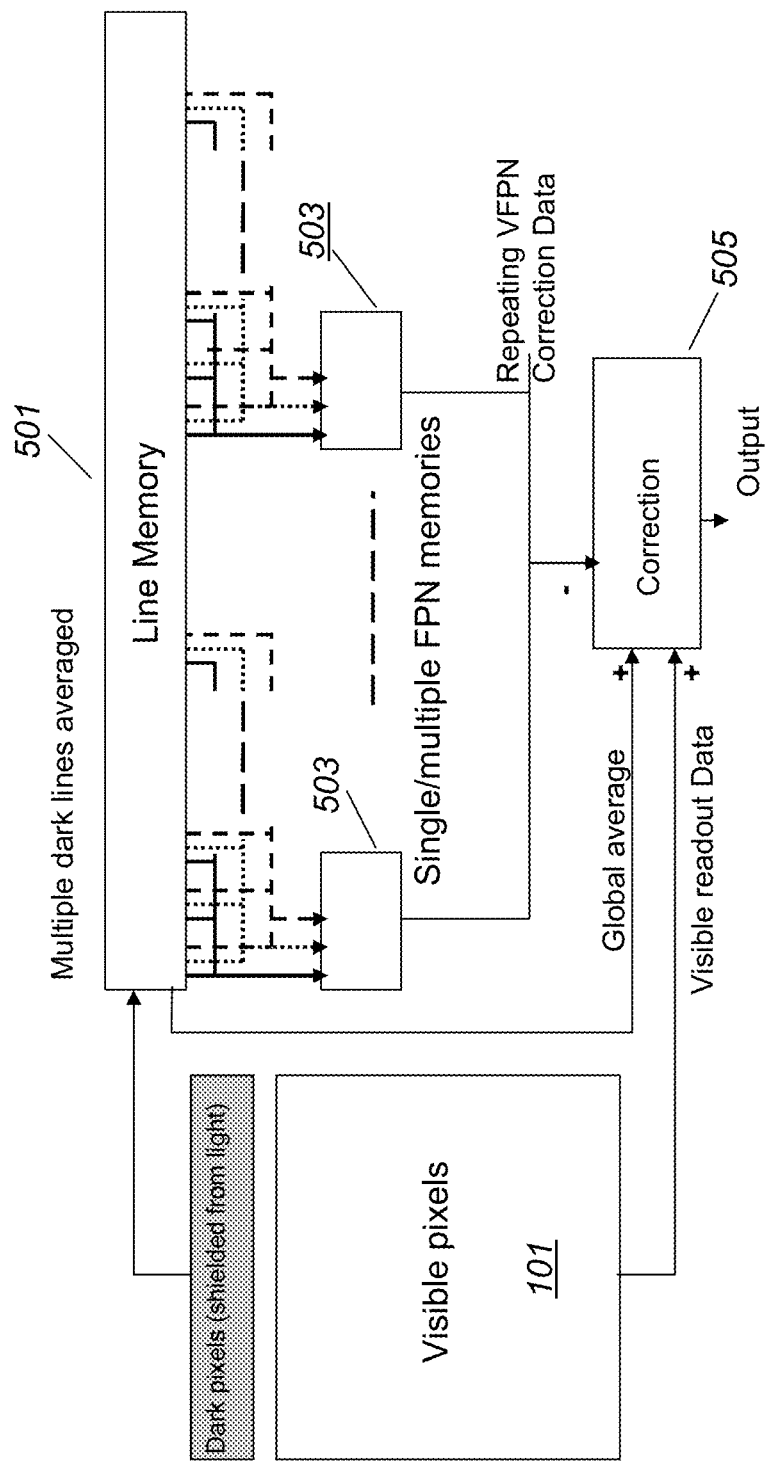
FIG. 5 is a schematic diagram showing the method of averaging repeated FPN patterns according to a preferred embodiment of the present disclosure.

According to a preferred embodiment of the present disclosure a line memory 501, as represented in FIG. 5 is used to contain average dark samples of the M columns of array of active pixels 101. Line memory 501 can e.g. have the same size M as the rows of the array of active pixels (M is of course also the number of columns in the array 101). It is believed that using a line memory 501 with the same size as the array of pixels 101 is the more immediate solution, however it cannot be excluded that different arrangements could be used instead. Normally multiple reads of the optically masked line, or of several optically masked lines, are made and the results are digitally averaged into a line memory. However even a single reading of a single optically masked pixel row could be performed in a simpler embodiment. Considering the multiple reading, the averaged line memory samples are then transferred into a smaller memory 503 having a size N which is lower than M. In a preferred embodiment of the present disclosure, the size N represents an integer multiple of the size of the common block readout, including the option of N being equal to the common block readout.

It is worth noting that it may not be necessary to transfer charge from the photodiode itself when reading from the optically masked lines. This means there may be no requirement to pulse the Transfer Gate (TG) (see 305 in FIG. 3a). Employing this technique will remove some noise contributions from the values read out, including reset noise. It also removes the requirement for an integration period, allowing acceleration of the readout if only one optically masked row is used. The preferred embodiment includes flexibility to assess the benefits of photodiode transfer against having no photodiode transfer, since its omission may compromise droop correction information relating to signal timings, or voltage drops across the pixel array.

FPN values are averaged from the line memory into the smaller N-size memory, so that position $n_t$ of N-size memory includes a value indicative of the average of every value in position yN+t of M-sized line memory wherein y is an integer and $0<=y<=M/N-1$ In a preferred embodiment of the present disclosure, at the beginning of the process, each value of line memory is copied into the corresponding position in the smaller memory 503. After N samples taken from line memory 501, the sample N+1 will contribute to the first position of the smaller memory 503, the sample N+2 will contribute to the second position and so on till the N+N; then we start again with 2N+1 and so on. After all samples have been taken, the values of the smaller memory will represent the average of the repeated pattern of the FPN.

Figure 6:
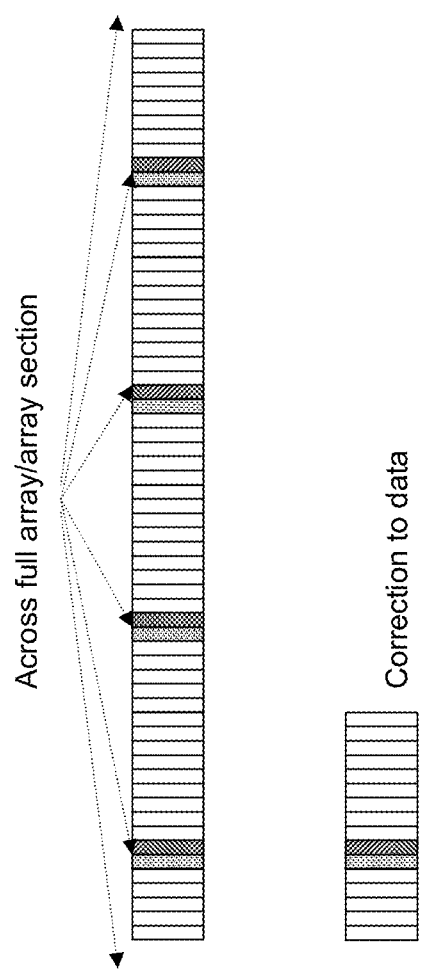
FIG. 6 shows an example of column spacing between group members according to a preferred embodiment of the present disclosure.

In a preferred embodiment of the present disclosure M is an integer multiple of N (even if this is not mandatory), so that each position of the smaller line memory will represent the average of M/N original values. This averaging process reduces the pixel temporal noise contribution in the correction data. The content of memory 503 is then provided to a Correction module 505 and used to correct the image signals being received from the active pixel array 101. For each visible pixel value read out the Repeated FPN correction data contained in memory 503 is subtracted. The x-th memory location of N is subtracted from column outputs x, N+x, 2N+x, . . . , yN+x, where y=M/N. FIG. 6 shows a visible representation of this averaging process which brings the values of line memory 501 into smaller memory 503.

As shown in FIG. 5 it is possible to implement the correction mechanism with multiple memories 503 instead of a single one. In such case the process described above is implemented a number of times. For example, as shown in FIG. 5, we could consider the line memory 501 as divided in two halves, each of width M/2. Each half will be averaged (as explained above) into a separate memory 503 with separated averaging processes carried out on each half of the line memory 501. The first set of correction data will then be applied to the first half of the array, while the second set of correction data will be applied to the second half. Both approaches, i.e. applying the correction process across the whole array, or splitting the array into sets of columns, can be used. Using the full array has the advantage of using as many pixels as possible to reduce the pixel temporal noise contribution to the correction as much as possible. Splitting the array into multiple sets of columns allows any variation of Repeated FPN across the array, which may be due to settling issues on supply lines, to be better accounted for. This last approach could be useful where the repeated FPN pattern slightly changes depending on the location in the array in the x direction.

As an optional additional feature, in order to improve the resulting image and in order to maintain the image mean while subtracting the Repeated FPN correction data, it is advisable to add a Global Average value which is an average of all the averaged line memory samples. For each visible pixel value read out, this value is added, while the Repeated FPN correction data is subtracted as explained above.

Figure 7:
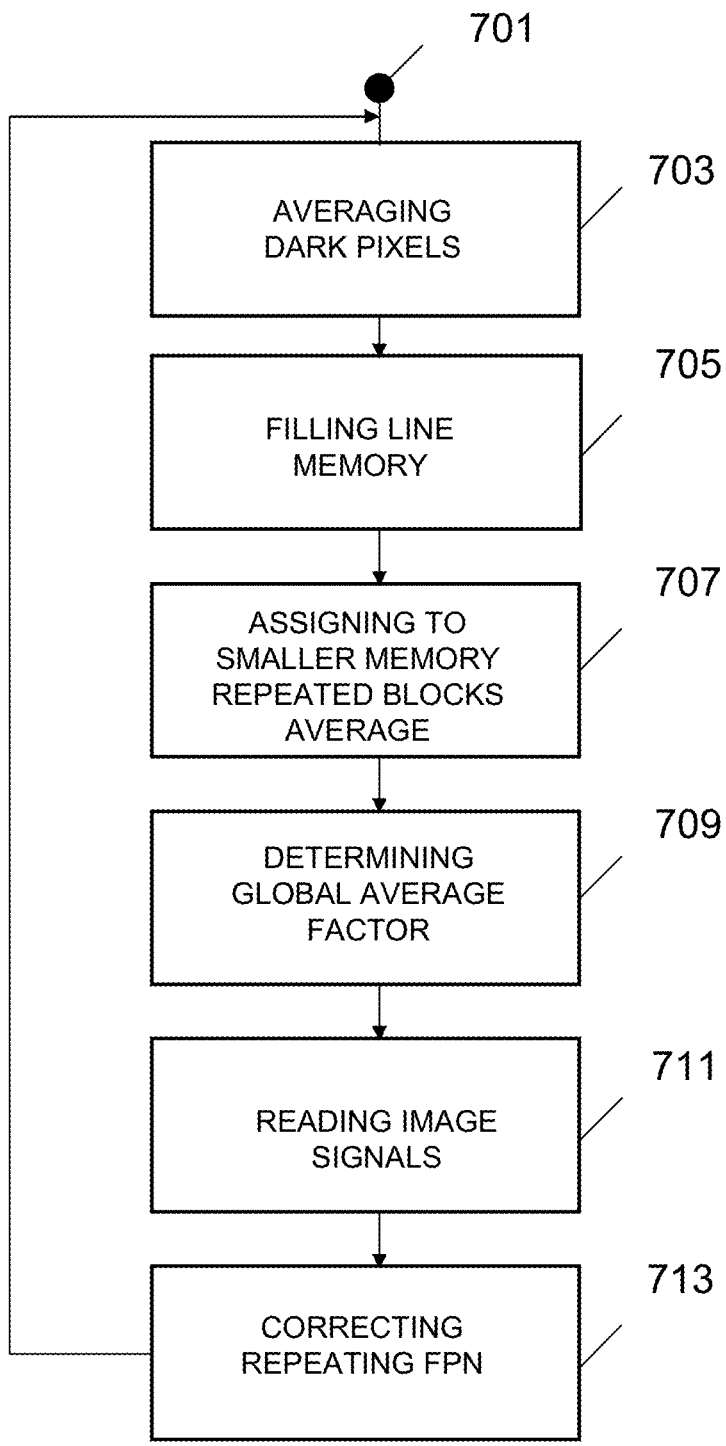
FIG. 7 is a diagram of the method steps of a preferred embodiment of the present disclosure.

FIG. 7 schematically shows a diagram representing the method steps of a preferred embodiment of the present disclosure. The process starts at circle 701 and it is transferred to box 703 where optically masked pixels from the dark area are read and averaged. As mentioned above the dark pixel area could include one single row of optically masked pixels or a plurality of rows. In case they are several, as in the preferred embodiment, an averaging action is required. This activity could be done either by averaging the plurality of corresponding pixels in one position, or alternatively a plurality of reading of the same pixel to minimize the effects of temporal noise and power supply variation (this second averaging can be applied to the case where only one single row of dark pixel is available). Yet another option is to combine the two techniques above. The M-size line memory is then filled with the averaged value at box 705. Moving to box 707 the averaged line memory samples are then transferred into a smaller memory. As explained above, the size N of the smaller memory represents an integer multiple of the size of the common block readout, including the option of N being equal to the common block readout. M/N bocks of FPN values are averaged from the line memory into the smaller N-size memory, so that position $n_t$ of N-size memory includes a value indicative of the average of every value in position yN+t of M-sized line memory for each integer value of y, wherein $0<=y<=M/N-1$. Once the Repeated FPN correction block is created, the image signals can be read from the image sensor (see box 711) and processed by the correction mechanism. An optional step is that of determining a global average factor (see box 709), calculated e.g. as a global average of all values of first M-sized line memory. Such Global Average factor can be added to corrected image signals so that the image mean is maintained. In a preferred embodiment of the present disclosure, in the calculation of such Global Average factor, those values exceeding a given threshold T are not considered. Finally, at box 713 the image signals are corrected by subtracting the Repeated FPN values and possibly adding the Global Average factor. The last two actions 711 and 713 in a preferred embodiment of the present disclosure are performed line by line and are repeated for each of the Y rows. The process can then restart with new samples taken from the optically masked area when e.g. a new frame of a moving image is received or a completely new image is to be processed.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present disclosure lends itself to be carried out with a hardware structure (for example, integrated in a chip of semiconductor material), or with a combination of software and hardware.

What is claimed is:

1. A method for correcting repeated Fixed Pattern Noise (FPN) from a digitally encoded image captured with an image sensor, comprising an array of active pixels arranged in Y rows and M columns, at least one row comprising optically masked pixels which are shielded from incident radiation, so that the output image signals obtained from each at least one optically masked pixel in a column represent column FPN of the corresponding column, the method comprising:

recording into at least one L-size line memory the values indicative of the column FPN for L corresponding columns of the array;

for each at least one L-size line memory, averaging the column FPN values into a smaller N-size noise memory, wherein position $n_t$ of N-size noise memory includes a value indicative of the average of the column FPN values from the positions yN+t of the L-sized line memory for each integer value of y, wherein $0<=y<=L/N-1$ and $0<=t<N$;

reading the pixel image signals from the array of active pixels; and adjusting the read pixel image signals according to the averaged column FPN values of the at least one N-size noise memory.

2. The method of claim 1 wherein L=M and only one line memory and one corresponding smaller N-sized noise memory are used.

3. The method of claim 1 wherein a set off L-sized line memories are used each one having width L=M/f and wherein the recording and adjusting are repeated f times, each time on successive f portions of the M columns.

4. The method of claim 1 wherein the columns are grouped in subsets of G columns and wherein N is equal to G.

5. The method of claim 1 wherein the value indicative of a column FPN recorded into the L-size line memory includes an average of all FPN values of the b optically masked pixels in the corresponding column.

6. The method of claim 1 wherein the column FPN values recorded into the L-size line memory each include an average of multiple readings of one optically masked pixel per column.

7. The method of claim 1 wherein adjusting the read pixel image signals includes:

subtracting the recorded N averaged column FPN values from successive blocks of N columns of pixel image signals until all pixel image signals have been corrected.

8. The method of claim 1 wherein adjusting the read pixel image signals includes:

adding to each pixel a global average factor calculated by averaging all of the column FPN values of the at least one L-size line memory.

9. The method of claim 6 further including:

if the column FPN value in the L-size line memory exceeds a threshold T, said averaging does not include such threshold exceeding value.

10. The method of claim 1, wherein the method is embodied in an image correction software product including a computer program.

11. A system, comprising:

an image sensor capturing digitally encoded image including repeated Fixed Pattern Noise (FPN), the sensor comprising:

an array of active pixels arranged in Y rows and M columns, and at least one row comprising optically masked pixels which are shielded from incident radiation, so that the output image signals obtained from each at least one optically masked pixel in a column represent column FPN of the corresponding column;

a processing system adapted to perform the following operations:

recording into at least one L-size line memory the values indicative of the column FPN for L corresponding columns;

for each at least one L-size line memory, averaging the column FPN values from the line memory into a smaller N-size noise memory, wherein position $n_t$ of N-size noise memory includes a value indicative of the average of the column FPN values from the positions yN+t of the L-sized line memory for each integer value of y, wherein $0<=y<=L/N-1$ and $0<=t<N$;

reading the pixel image signals from the array of active pixels; and adjusting the read pixel image signals according to the averaged column FPN values of the at least one N-size noise memory.

12. The system of claim 11 wherein the sensor is a solid state image sensor.

13. The system of claim 12 wherein the processing system is a digital image processing device.

14. The system of claim 12 wherein the processing system is a computer system including computer program instructions adapted for carrying out the operations.

15. A method for correcting repeated Fixed Pattern Noise (FPN) from a digitally encoded image using an optically masked pixel image, comprising:

recording into an L-size line memory a value indicative of the FPN values of L optically masked pixels;

averaging spaced apart ones FPN values from the line memory to form averaged FPN values stored in a smaller N-size noise memory, wherein position $n_t$ of N-size noise memory includes a value indicative of the average of the FPN values from the positions yN+t of L-sized line memory for each integer value of y, wherein $0<=y<=L/N-1$ and $0<=t<N$;

reading pixel image signals from the digitally encoded image; and adjusting the read pixel image signals according to the averaged FPN values of the N-size noise memory.

16. The method of claim 15 wherein L is equal to the number of columns in the digitally encoded image.

17. The method of claim 15 wherein the columns are grouped in subsets of G columns and wherein N is equal to G.

18. The method of claim 15 wherein adjusting the read pixel image signals includes:

subtracting the recorded N averaged FPN values from successive blocks of N columns of pixel image signals until all pixel image signals have been corrected.

19. The method of claim 15 wherein adjusting the read pixel image signals includes:

adding to each pixel a global average factor calculated by averaging all of the FPN values of the L-size line memory.

* * * * *

UNITED STATES PATENT AND TRADEMARK OFFICE
CERTIFICATE OF CORRECTION

| | | |
|---|---|---|
| PATENT NO. | : 8,564,695 B2 | Page 1 of 1 |
| APPLICATION NO. | : 12/945422 | |
| DATED | : October 22, 2013 | |
| INVENTOR(S) | : John Kevin Moore | |

It is certified that error appears in the above-identified patent and that said Letters Patent is hereby corrected as shown below:

In the Claims:

At column 7, claim number 3, line number 9, please replace [off] with -- of --.

Signed and Sealed this
Twenty-fifth Day of February, 2014

Michelle K. Lee
*Deputy Director of the United States Patent and Trademark Office*